Patented Dec. 9, 1930

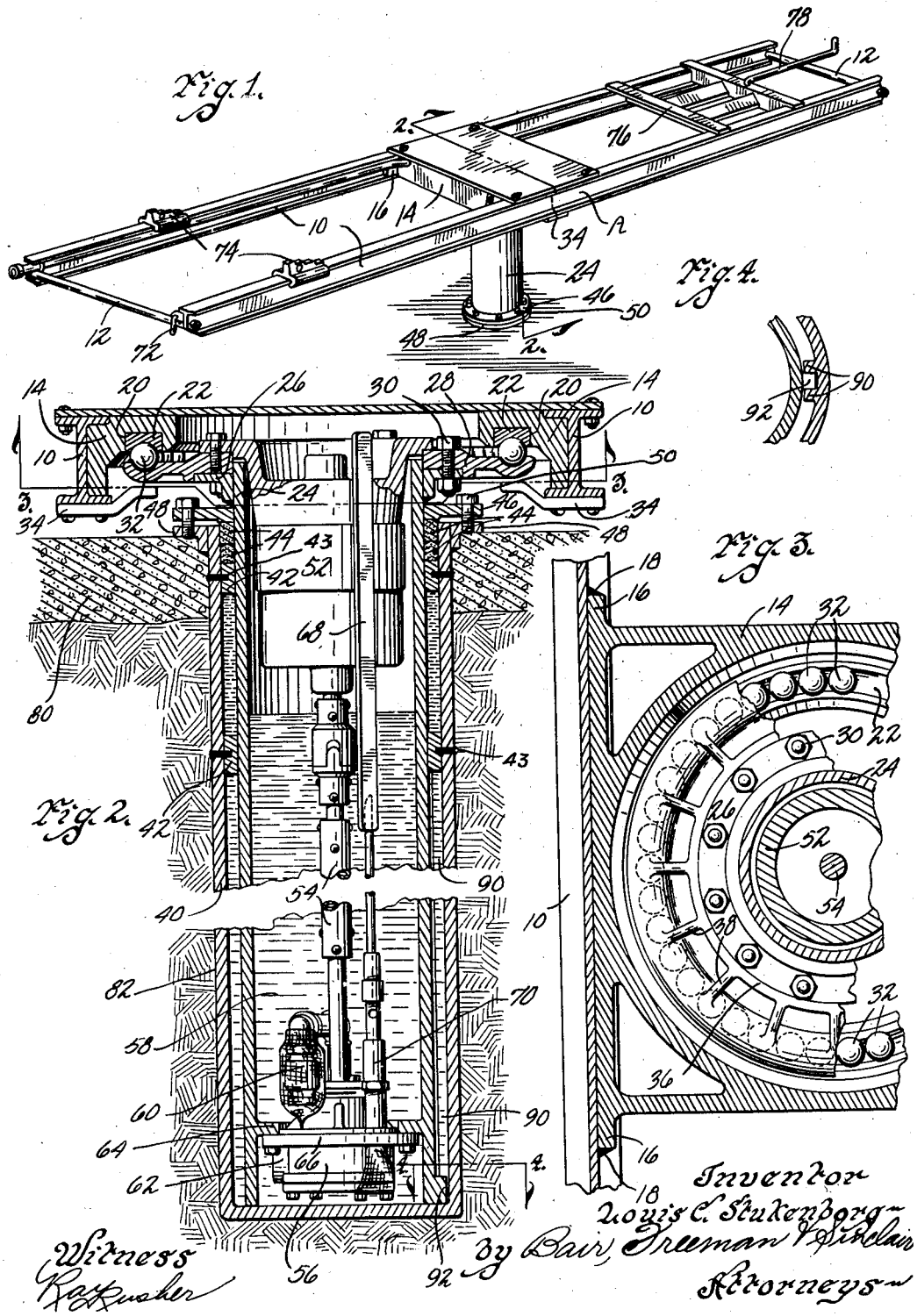

1,784,554

UNITED STATES PATENT OFFICE

LOUIS C. STUKENBORG, OF MEMPHIS, TENNESSEE, ASSIGNOR TO OILDRAULIC LIFT COMPANY, OF MEMPHIS, TENNESSEE

ROTARY AUTOMOBILE LIFT STRUCTURE

Application filed June 14, 1929. Serial No. 370,765.

The object of my invention is to provide a rotary automobile lift structure of simple, durable and comparatively inexpensive construction.

More particularly, it is my object to provide in a lift structure consisting of a cylinder, a piston, a packing means interposed between the cylinder and the piston and a superstructure adapted to engage, support and lift an automobile, a thrust bearing construction interposed between the ram and the superstructure, such thrust bearing having a co-efficient less than the co-efficient between the packing means and the ram, whereby when it is desired to rotate the superstructure relative to the ram, the superstructure may be engaged and rotated by an operator without rotating the ram and thus preventing undue wear on the packing means.

Still a further object is to provide positive means to prevent rotation of the ram relative to the cylinder if desired.

Still a further object is to provide in connection with a lifting ram, a bearing race secured to the top thereof and a superstructure having a bearing race secured to the bottom thereof, a plurality of roller type bearings being interposed between the two bearing races for the purpose of forming an easily rotated superstructure for supporting and lifting automobiles so that the automobile may be swung around to any desired position for working thereon while supported in elevated position on the lift structure.

In this connection, I wish it to be understood that by roller type bearings, I mean either the ball or cylindrical roller type, wherein the bearings roll between bearing races.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a perspective view of a rotary automobile lift structure of the free wheel type provided with my improved construction of thrust bearing connection between the lifting ram and the superstructure.

Figure 2 is an enlarged vertical sectional view of the same on the line 2—2 of Figure 1; and Figures 3 and 4 are sectional views on the lines 3—3 and 4—4 of Figure 2.

On the accompanying drawings, I have used the reference character A to indicate generally, a superstructure adapted to engage and support an automobile. The superstructure A consists of a pair of side rails 10 having their ends connected by braces 12. The side rails 10 may be formed of I beam construction.

Connected with the central portions of the rails 10 is a rectangular-shaped casting 14 which may be provided with flanges 16 welded to the webs of the rails 10, as indicated at 18.

The casting 14 is provided with an annular recess 20 adapted to receive an inverted bearing race 22 of hardened metal. The superstructure A is adapted to be lifted and supported by a ram 24. The ram 24 has welded to its upper end, a flange 26 to which is bolted an annular bearing race 28. The bearing race 28 is preferably of hardened metal and may be secured to the flange 26 by a plurality of bolts 30.

Interposed between the bearing races 22 and 28 is a plurality of ball bearings 32. If found desirable, the races 22 and 28 may be designed for thrust bearings of the cylindrical roller type.

To prevent accidental dislodgement of the superstructure A from the ram 24, I provide a pair of brackets 34 secured to the side rails 10 and having their inner ends slightly spaced below the bearing race 28, as clearly shown in Figure 2.

Thus, such accidents as the superstructure

A coming down on an object and the ram 24 continuing to move away therefrom and the possibility of the balls 32 being dislodged from the bearing race 28 is eliminated.

The bearing race 28 may be provided with an annular rib 36 adapted to contact with the periphery of the flange 26 for bracing the bearing race 28. Webs 38 may also be provided for additionally strengthening the bearing race 28.

In the drawings, I have illustrated an electric motor driven pump structure for raising the ram 24 relative to a cylinder 40 in which it is telescopically mounted. Guide rings 42 are provided for guiding the ram 24 relative to the cylinder 40 and may be secured in position by welding metal 43 filled in holes drilled through the cylinder 40 and into the rings 42.

Packing means 44 is interposed between the outside of the ram 24 and the inside of the cylinder 40 and is forced in position by a packing flange 46. The packing flange 46 is adjustably bolted to a flange 48 by means of bolts 50. The flange 48 is welded to the upper end of the cylinder 40.

Within the ram 24, which is of hollow construction, a pump motor 52 is mounted. The pump motor 52 by means of a drive shaft 54 drives a pump structure 56.

The cylinder 40 and ram 24 are adapted to be filled with a liquid 58, such as lubricating oil to the level shown in Figure 2 when the ram is in lowered position. This liquid is adapted to be pumped through a screened check valve 60 by the pump 56 and discharged from the pump through an outlet 62.

The check valve 60 is mounted above an inwardly extending flange 64 of the ram 24 and a partition member 66 forming a mounting for the pump 56, while the outlet 62 is mounted below the flange 64 and partition 66. Thus, it will be seen that operation of the pump 56 causes a flow of the oil 58 from the ram 24 into the cylinder 40 below the lower closed end of the ram and thereby lifts the ram and the superstructure A.

The ram 24 and superstructure A may be lowered by pushing downwardly on a control rod 68 for opening a release valve 70, which allows oil to flow from below the ram 24 to the reservoir space within the ram.

A remote control lever 72 is provided for controlling the control rod 68.

The parts just described are merely by way of illustrating one form of lift with which my thrust bearing construction may be used and it is obvious that it could also be used with the type of lift employing air under pressure discharged into the ram 24 above the oil 58 for forcing such oil through a partition provided with a check valve at the lower end of the ram.

The superstructure A is provided with accessories 74 and 76 adapted to engage the front axle and differential housing respectively of an automobile for supporting the same relative to the lift.

The rods 78 having hooked ends are merely for the purpose of adjusting the accesories 74 and 76 beneath the automobile when driven over the superstructure A so that they engage the proper parts of the automobile.

The flange 48 is adapted to rest on a concrete floor 80 and the cylinder 40 thereby embedded in a bore 82 formed in the earth below the concrete floor 80.

It will be seen that I have provided a means of preventing excess wear on the packing 44, since with the thrust bearing construction illustrated, friction is produced on the packing means only during lifting and lowering operations of the lift structure and not during rotating movements of the superstructure A, which are quite frequent in order to gain access to the various parts of the automobile to be repaired, oiled, or washed, etc.

It will be obvious that the packing means 44 must be quite tight in order to prevent leakage of oil caused by pressure due to the weight of an automobile tending to force the ram 24 downwardly and there is therefore considerable friction between the packing means and the vertically slidable ram.

The bearings 32 being of the roller type, reduce friction in the thrust bearing construction to a minimum and therefore, rotation of the superstructure A relative to the bearing race 28 will occur, rather than rotation of the ram 24 relative to the packing means 44.

If desired, a means can be provided to positively prevent rotation of the ram relative to the cylinder. Such means can be in the form of a pair of guide bars 90 secured to the inner surface of the cylinder 40 and a lug 92 projecting from the lower end of the ram 24. The lug 92 is adapated to be guided between the bars 90 during the raising and lowering movement of the lift structure and will positively prevent any rotation of the ram relative to the cylinder in which it is encased.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a device of the class described, the combination of a cylinder having a lifting ram projecting therefrom and a packing means interposed between the cylinder and the ram, a superstructure rotatably mounted on the ram and adapted to engage and support an automobile or the like, a thrust bearing between said lifting ram and said superstructure, such bearing having a co-efficient of friction less than the co-efficient of friction between said packing means and said ram.

2. In a device of the class described, the combination of a cylinder having a lifting ram projecting therefrom and a packing means interposed between the cylinder and the ram, a superstructure rotatably mounted on the ram and adapted to engage and support an automobile or the like, a thrust bearing between said lifting ram and said superstructure, said thrust bearing permitting the superstructure to be rotated relative to the ram rather than the ram relative to the packing means.

3. In a lift structure, a ram, packing means thereagainst, a superstructure supported by the ram, a roller type thrust bearing interposed between the ram and the superstructure whereby the superstructure may be rotated relative to the ram rather than the ram relative to the packing means, and means to prevent rotation of the ram relative to the packing means.

Des Moines, Iowa, May 23, 1929.

LOUIS C. STUKENBORG.